(12) United States Patent
Kaler et al.

(10) Patent No.: US 7,395,311 B2
(45) Date of Patent: Jul. 1, 2008

(54) PERFORMING GENERIC CHALLENGES IN A DISTRIBUTED SYSTEM

(75) Inventors: Christopher G. Kaler, Sammamish, WA (US); Giovanni M. Della-Libera, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 982 days.

(21) Appl. No.: 10/340,225

(22) Filed: Jan. 10, 2003

(65) Prior Publication Data

US 2004/0139152 A1 Jul. 15, 2004

(51) Int. Cl.
*G06F 15/16* (2006.01)
(52) U.S. Cl. ....................................... 709/203
(58) Field of Classification Search .................. 709/203
See application file for complete search history.

(56) References Cited

U.S. PATENT DOCUMENTS

| 7,200,576 | B2 | 4/2007 | Steeves et al. | |
|---|---|---|---|---|
| 2003/0055962 | A1* | 3/2003 | Freund et al. | 709/225 |
| 2005/0065802 | A1 | 3/2005 | Rui et al. | |
| 2005/0091338 | A1 | 4/2005 | de la Huerga | |
| 2005/0166263 | A1 | 7/2005 | Nanopoulos et al. | |
| 2005/0239447 | A1 | 10/2005 | Holzman et al. | |
| 2006/0041759 | A1 | 2/2006 | Kaliski, Jr. et al. | |
| 2006/0095578 | A1 | 5/2006 | Paya et al. | |
| 2007/0101010 | A1 | 5/2007 | Ellison et al. | |
| 2007/0234423 | A1 | 10/2007 | Goodman et al. | |
| 2007/0239730 | A1 | 10/2007 | Vigelette et al. | |

OTHER PUBLICATIONS

SOAP Extensions: Basic and Digest Authentication, Network Working Group Internet-Draft, Oct. 31, 2001. Cunnings and Salz.*
Della-Libera et al. Web Service Trust Language (WS-Trust), Dec. 18, 2002.*
U.S. Appl. No. 11/925,734, "Generic Interactive Challenges in a Distributed System" Filed Oct. 26, 2007.

* cited by examiner

*Primary Examiner*—Andrew Caldwell
*Assistant Examiner*—Grant Ford
(74) *Attorney, Agent, or Firm*—Workman Nydegger

(57) ABSTRACT

A client issues a first electronic request to access a service at a server. The server receives the request and identifies a type of challenge form among a number of different types of challenges (e.g., represented by a number of different XML schemas). The server issues a challenge, in accordance with the identified type of challenge, to the client. The challenge can include state information that indicates to the server when an appropriate response to the challenge is received. The client receives the challenge and formulates a response (including the state information) to the challenge in accordance with the identified type of challenge. The client issues a second electronic request, which includes the formulated response. The server receives the response and determines, based on the response, if the second electronic request is to be processed.

36 Claims, 4 Drawing Sheets

PERFORMING GENERIC CHALLENGES IN A DISTRIBUTED SYSTEM

BACKGROUND OF THE INVENTION

1. The Field of the Invention

The present invention relates to computer system authentication, and more specifically, to challenges for determining the identity of a computer system and challenges for potentially reducing the impact of denial-of-service attacks.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another to form computer networks over which the computer systems can communicate electronically to share data. As a result, many of the tasks performed at a computer system (e.g., accessing electronic mail and web browsing) include electronic communication with one or more other computer systems via a computer network (e.g., the Internet).

Often, electronic communication on a computer network includes a client computer system (hereinafter referred to as a "client") requesting access to a service (e.g., electronic mail or a web page) at a server computer system (hereinafter referred to as a "server"). Before granting the client access to the service, the server may issue a challenge to the client requiring the client to prove it's identity to the server. A challenge may be a relatively simple challenge, such as, for example, challenging a user at the client to enter a user-name and password. On the other hand, a challenge may be more complex, such as, for example, challenging the client to correctly perform a complex handshake sequence.

Unfortunately, existing challenge mechanisms often utilize specialized protocols to issue challenges and receive responses to challenges. Some of these specialized protocols, such as, for example, the Session Initiation Protocol ("SIP"), prescribe both the types of challenges that are used and the protocols used to implement the challenges. Other of these specialized protocols, such as, for example, the Secure Sockets Layer ("SSL") handshake sequence and Secure and Protected Negotiation ("SPNEGO") allow the protocols used to implement challenges to be varied.

However, while the algorithms used to implement challenges can be varied, the types of challenges typically cannot. For example, the SSL handshake sequence requires particular portions of data exchanged between the client and server to be signed. While the algorithms used to sign the data can be varied, the requirement that the particular portions of data be signed cannot be varied. Further, the different algorithms used to sign data are hard coded into SSL. Thus, an SSL handshake sequence is typically limited to these hard coded algorithms.

This makes it difficult to extend the SSL handshake sequence (or other typical challenge protocols) to support additional types of challenges and support additional algorithms for implementing challenges. Further, as challenges can be used in a large and diverse number of different computing environments, there is little chance that every possible type of challenge and algorithm could be implemented by a single handshake protocol. Altering a well-documented or standardized protocol, such as, for example, the SSL handshake protocol, can also lead to incompatibilities between computer systems.

Thus, an application designer may be constrained to using existing types of challenges even if some other type of challenge would be more advantageous for a particular application. In any event, applications (in part due to the configuration of protocol stacks) often lack the ability to alter functionality in lower layers of a protocol stack (e.g., the transport layer) where handshake protocols typically operate. Thus, even if an application desired the performance of a particular challenge, the application would have limited, if any, mechanisms to alter the functionality of a handshake protocol to implement the particular challenge.

Additionally, some protocols used to issue challenges are limited in the type of communications they support. For example, the SSL handshake is a state-based protocol that functions only when Transmission Control Protocol ("TCP") is used as a transport. Thus, applications that use stateless protocols, such as, for example, Universal Datagram Protocol ("UDP"), as a transport cannot issue or respond to SSL challenges. This is unfortunate as many applications use stateless protocols due to the low overhead associated with these protocols.

Further, the use of state-based protocols can increase the detrimental effects of attacks that flood a computer system with useless requests (commonly referred to as "denial of service" attacks). When a request is received, state information is created and maintained for the request. Typically, state information continues to be maintained for some amount of time after the request is received, even if no additional data for the request is received. For example, a computer system may maintain state information for a request during the period of time it waits for a response to an issued challenge. However, the initiator of the denial service attack is typically not interested in accessing the computer system and typically does not respond to the issued challenges. Thus, each request in a denial of service attack can consume computer system resources (e.g., system memory) even though none of the requests result in access to the computer system.

Therefore systems, methods, computer program products, and data structures for selecting a challenge from among different types of challenges would be advantageous. Systems, methods, computer program products, and data structures for issuing and responding to challenges in a stateless manner would also be advantageous.

BRIEF SUMMARY OF THE INVENTION

The foregoing problems with the prior state of the art are overcome by the principles of the present invention, which are directed towards methods, systems, computer program products, and data structures for performing generic challenges in a distributed system. One message processor (hereinafter referred to as the "client") issues a first electronic request (e.g., in an electronic first message) to access a service at another message processor (hereinafter referred to as the "server"). After receiving the first electronic request, the server identifies a type of challenge from among a number of different types of challenges. The server may have access to any number of different types of challenges, such as, for example, random number problems, cryptographic problems, and digital signature problems. The server can identify one of the types of challenges based on, for example, data included in the request, a previously established context between the client and the server, or an intersection of supported challenges between the client and the server.

In some embodiments, an XML schema representing a type of challenge can be identified from among a plurality of different XML schemas representing different types of challenges. An application designer may design an application to access one of the XML schemas. Thus, an application designer may utilize a challenge that is appropriate for the particular application without being constrained to challenges inherent in handshake protocols.

The server issues a challenge (e.g., in a second electronic message) in accordance with the identified type of challenge. For example, if an identified type of challenge is a random number problem, the server may issue a challenge that includes a range of numbers, an indication of a message digest algorithm, and a message digest of a random number. A challenge can also include an optional authentication token that includes, for example, an encrypted version of the answer to the random number problem. Thus, a server may include all the data for indicating a challenge to the client and all the data for determining if an appropriate response is received within an issued challenge. As such, there is no need to maintain this data at the server. If the server detects that it is receiving an inappropriately high number of requests (e.g., as part of a denial of service attack), the server may issue a challenge that will cause the client to expend a fixed number of processor cycles.

After receiving the challenge, the client formulates a response to the challenge in accordance with the type of challenge that was identified by the server. For example, if the type of challenge is a random number problem, the client can formulate a response that includes the answer to the random number problem. The client can also formulate a response that includes the original request and the authentication token. Thus, the client may include all of the data for responding to a challenge within a formulated response. As such, there is no need to maintain this data at the client. Formulating a response can include expending a fixed number of processor cycles (e.g., processor cycles expended to calculate a random number).

The client sends a second electronic request (e.g., in a third electronic message), which includes the formulated response, to access the service. The server receives the second electronic request including the formulated response. Based on the formulated response, the server determines if the request is to be processed. In some embodiments, the formulated response can also be used to authenticate the client.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
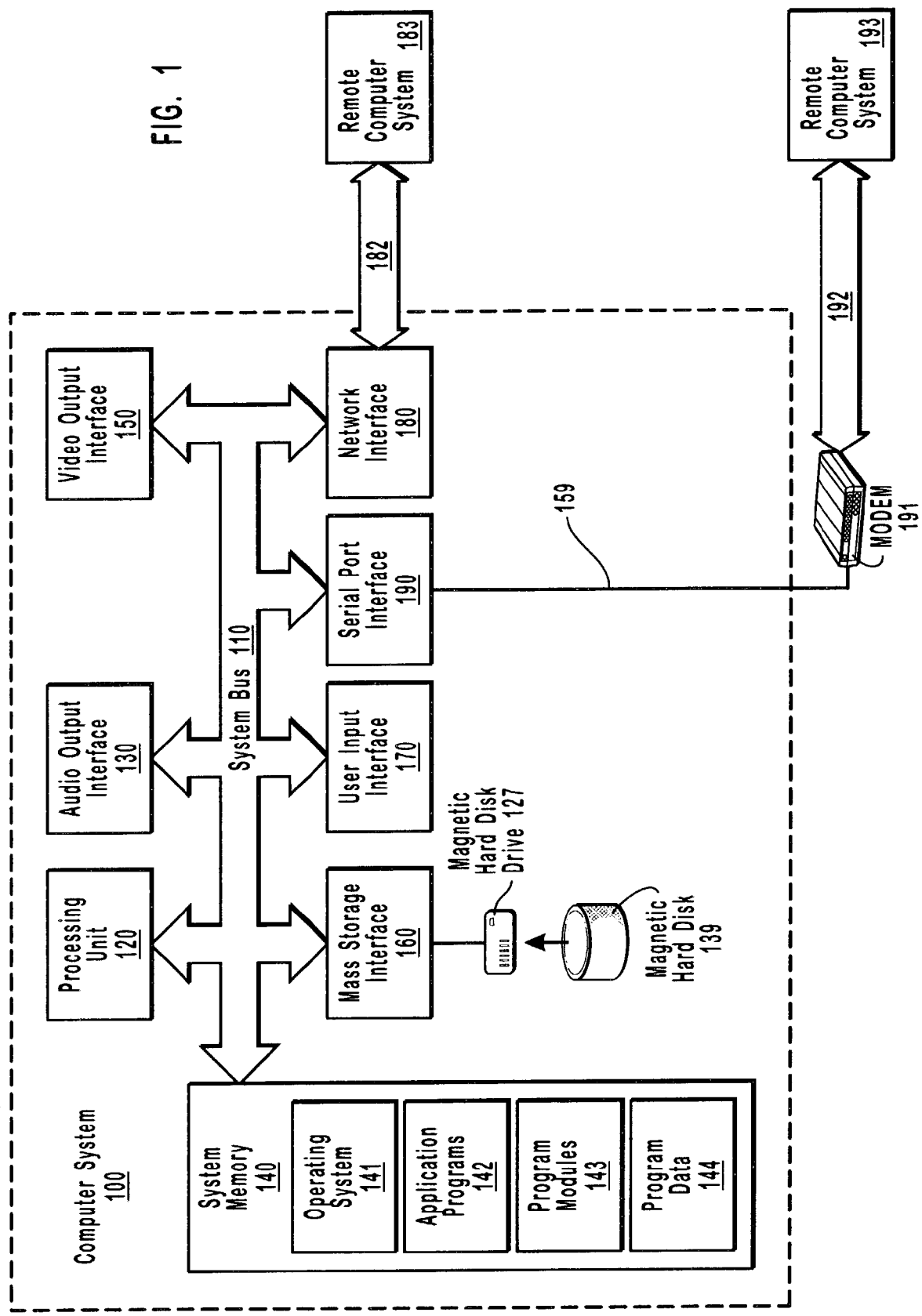
FIG. 1 illustrates a suitable operating environment for the principles of the present invention.

The principles of the present invention provide for performing generic challenges in a distributed system. A client message processor issues a first electronic request to access a service at a server message processor. The server message processor receives the first electronic request and identifies a type of challenge from among a plurality of different types of challenges. The server message processor issues a challenge in accordance with the identified type of challenge. For example, if a type of challenge is a random number determination problem, the server message processor can issue a challenge that includes, for example, a range of numbers, an indication of a message digest algorithm, and a message digest of a random number.

The client message processor receives the challenge and formulates a response to the challenge. This can include formulating a response in accordance with the type of challenge that was identified by the server message processor. For example, if the type of challenge is a random number determination problem, the client can formulate a response that includes the answer to the random number determination problem. The client message processor issues a second electronic request, which includes the formulated response, to access the service. The server message processor receives the response and based on the response determines if the request should be processed.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems can exchange data with each other. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as none or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, "client" is defined as a message processor that accesses (or attempts to access) a service provided by another message processor. In this description and in the following claims, "server" is defined as a message processor that provides a service that can be accessed by other message processors. Depending on the environment, a message processor may access services from other message processors and/or provide services other message processors. Thus, a message process may act as a client in one context and a server in another context.

In this description and in the following claims, a "logical communication link" is defined as any communication path that enables the transport of electronic data between two entities such as computer systems, message processors, or modules. The actual physical representation of a communication path between two entities is not important and may change over time, such as, for example, when the routing path of an electronic message is changed. A logical communication link may include portions of a system bus, a local area network, a wide area network, the Internet, combinations thereof, or portions of any other path that can facilitate the transport of electronic data. Logical communication links are defined to include hardwired links, wireless links, or a combination of hardwired links and wireless links. Logical communication links may also include software or hardware modules that condition or format portions of data so as to make them accessible to components that implement the principles of the present invention. Such components may include, for example, proxies, routers, switches, firewalls, or gateways. Logical communication links may also include portions of a virtual network, such as, for example, a Virtual Private Network ("VPN") or Virtual Local Area Network ("VLAN").

In this description and in the following claims, a "message processor" is defined as one or more modules (hardware and/or software) that operate together to perform messaging operations on electronic messages. Messaging operations may include, for example, initiating a message, accessing a message, appending information to a message, sending a message, receiving a message, routing a message, removing information from a message, and terminating a message. Any message processor can include the functionality to perform one or more of these messaging operations. It may be that the modules of a message processor are included within a general-purpose computer system, such as, for example, within a laptop or desktop computer system. On the other hand, it may also be that the modules of a message processor exist as a standalone special-purpose computer system, such as, for example, a router.

In this description and in the following claims, a "schema" is defined as an expression of a shared vocabulary between a plurality of computer systems and/or a plurality of message processors that allows the plurality of computer systems and/or the plurality of message processors to process documents according the expressed shared vocabulary. For example, an eXtensible Markup Language ("XML") schema can define and describe a class of XML documents using schema constructs of an XML schema language. These schema constructs can be used to constrain and document the meaning, usage, and relationships of data types, elements and their content, attributes and their values, entities and their contents, and notations, as used in XML documents. Thus, any computer system or message processor that can access an XML schema can process XML documents in accordance with the XML schema. Further, any computer system or message processor that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actual file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. XML elements and attributes can be defined to represent data types that are defined by a schema.

In this definition and the following claims, "schema-based" refers to being defined by and/or in accordance with a schema.

In this description and the following claims, a "challenge marker" is defined as a data structure that is configured to maintain data for issuing a challenge (hereinafter referred to as "challenge data"). For example, a challenge marker can be included in the header and/or body portion of an electronic message to represent an issued challenge.

In this description and the following claims, a "response marker" is defined as a data structure that is configured to maintain data for responding to a challenge (hereinafter referred to as "response data"). For example, a response marker can be included in the header and/or body portion of an electronic message to represent a response to a challenge.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired and wireless links) through a network, both perform tasks. In a distributed system environment, program modules may be located in both local and remote memory storage devices.

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a computer system 100. Computer system 100 may be a personal computer that has been adapted to perform the operations disclosed herein. It should be understood that computer system 100 is merely an example of one possible computer system configuration that can be used to practice the principles of the present invention.

Computer system 100 includes a user input interface 170 that receives information from an input device, such as, for example, a keyboard, microphone, or mouse. An input device can be coupled to user input interface 170 so as to enable the entry of information. An input device can transfer information over such a coupling in response to preprogrammed data or user manipulation of the input device.

Computer system 100 includes video output interface 150 that provides a video output signal to external video display devices. Computer system 100 may be integrally positioned with or separate from a video display device, such as, for example, a color or monochrome computer monitor. A video display device can be coupled to video output interface 150 so as to receive a provided video output signal.

Similarly, computer system 100 includes an audio output interface 130 that provides an audio output signal to external audio output devices. Computer system 100 may also be integrally positioned with or separate from an audio system, which includes a speaker or other device capable of emitting sound data. An audio system can be coupled to audio output interface 130 so as to receive a provided audio output signal.

Computer system 100 includes processing unit 120, which allows for complex and flexible general-purpose processing capabilities. Processing unit 120 executes computer-executable instructions designed to implement features of computer system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in computer system 100 is not important to the present invention. Program code means comprising one or more program modules may be stored in system memory 140. The one or more program modules may include an operating system 141, one or more application programs 142, other program modules 143, and program data 144.

Computer system 100 also includes magnetic hard disk drive 127 for reading from and writing to magnetic hard disk 139. The magnetic hard disk drive 127 is connected to system bus 110 by mass storage interface 160. Magnetic hard disk drive 127 and magnetic hard disk 139 provide nonvolatile storage of computer-executable instructions, data structures, program modules, and other data for computer system 100. For example, magnetic hard disk 139 can store one or more program modules including operating system 141, application programs 142, other program modules 143, and program data 144.

Computer system 100 can be network connectable to networks, such as, for example, an office-wide or enterprise-wide computer network, an intranet and/or the Internet. Computer system 100 can exchange data with external sources, such as, for example, remote computer systems and/or databases over such a network.

Computer system 100 includes network interface 180, through which computer system 100 receives data from external sources and/or transmits data to external sources. As illustrated in FIG. 1, network interface 180 facilitates the exchange of data with remote computer system 183 via logical communication link 182. Logical communication link 182 represents a portion of a network, and remote computer system 183 represents a node of the network. For example, remote computer system 183 may be a client that accesses services from computer system 100 or a server that provides services to computer system 100.

Likewise, computer system 100 includes serial port interface 190, through which computer system 100 receives data from external sources and/or transmits data to external sources. Serial port interface 190 is coupled to modem 191 via logical communication link 159, through which computer system 100 receives data from and/or transmits data to external sources. As illustrated in FIG. 1, serial port interface 190 and modem 191 facilitate the exchange of data with remote computer system 193 via logical communication link 192. Logical communication link 192 represents a portion of a network, and remote computer system 193 represents a node of the network. For example, remote computer system 193 may be a client that accesses services from computer system 100 or a server that provides services to computer system 100.

Alternatively, computer system 100 can exchange data with external sources through other interfaces, such as, for example, a parallel port, a game port, or a universal serial bus ("USB") port.

It should be understood that the described network connections are merely examples. It would be apparent to one skilled in the art, after having reviewed this description, that a wide variety of network connection techniques, in addition to those described with reference to FIG. 1, may be used to facilitate the exchange of data between computer system 100 and external sources.

While FIG. 1 represents a suitable operating environment for the present invention, the principles of the present invention may be employed in any computer system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, distributed applications, challenge modules, and response modules as well as associated data, including electronic messages, challenge markers, challenge data, response markers, response data, and schemas may be stored and accessed from any of the computer-readable media associated with computer system 100. For example, portions of such modules and portions of associated program data may be included in operating system 141, application programs 142, program modules 143 and/or program data 144, for storage in system memory 140. When a mass storage device, such as, for example, magnetic hard disk 139, is coupled to computer system 100, such modules and associated program data may also be stored in the mass storage device.

In a networked environment, program modules depicted relative to computer system 100, or portions thereof, can be stored in remote memory storage devices, such as, for example, system memory and/or mass storage devices associated with remote computer system 183 and/or remote computer system 193. Execution of such modules may be performed in a distributed environment as previously described.

Figure 2:
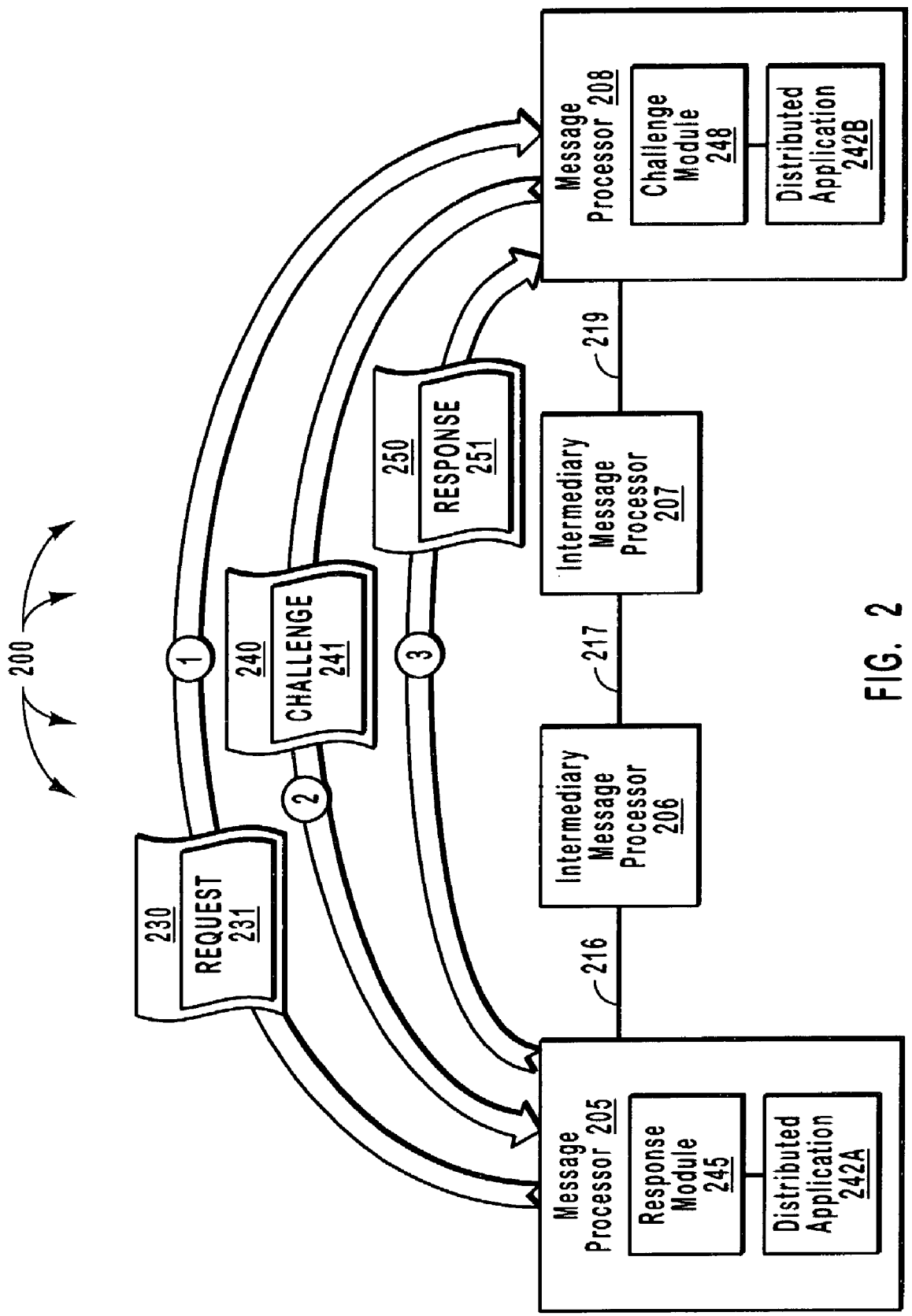
FIG. 2 illustrates an example of a network architecture that can facilitate the performance of a challenge.

FIG. 2 illustrates an example of network architecture 200 that can facilitate the performance of a challenge. Depicted in network architecture 200 are message processor 205, intermediary message processors 206 and 207, and message processor 208. Corresponding logical communication links 216, 217, and 219 connect the message processors depicted in network architecture 200. Message processors depicted in network architecture 200 can initiate electronic messages and route electronic messages to (or through) other messages processors within network architecture 200 or other message processes external to network architecture 200 (not shown).

For example, message processor 205 can initiate electronic message 230 that is routed through intermediary message processors 206 and 207 and received at message processor 208. However, message 230 can be routed through virtually any routing path, such as, for example, through one or more of the other message processors external to network architecture. Similarly, message processor 208 can initiate electronic message 240 that is routed (along the same or a different routing path from which message 230 was routed) to message processor 205.

Figure 3:
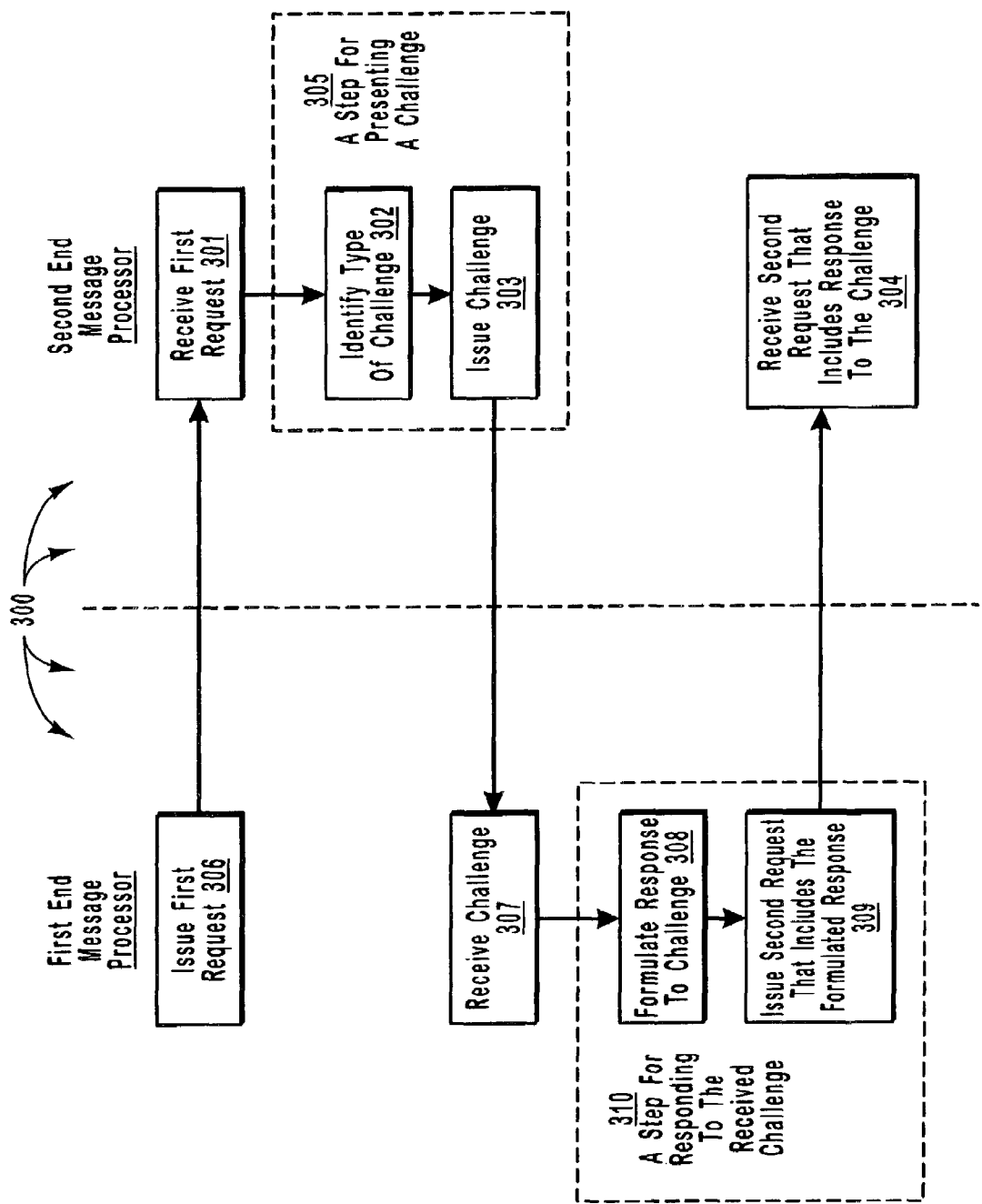
FIG. 3 illustrates an example flowchart of a method for performing a challenge.

FIG. 3 illustrates a flowchart of a method 300 for performing a challenge. The method 300 will be described with respect to the message processors depicted in network architecture 200.

Method 300 includes an act of issuing a first request (act 306). Act 306 can include issuing a first electronic request to access a service at a message processor. For example, as illustrated by arrow 1 in FIG. 2, message processor 205 issues electronic message 230, which includes request 231, to message processor 208. Request 231 may be a request from a module at message processor 205 (e.g., distributed application 242A) desiring to communicate with a service at message processor 208 (e.g., distributed application 242B). Distributed applications 242A and 242B (which hereinafter may collectively be referred to as distributed application 242) can be viewed as a first and second portion of a distributed application respectively.

Method 300 includes an act of receiving a first request (act 301). For example, as illustrated by arrow 1 in FIG. 2, message processor 208 receives electronic message 230, which includes request 231, from message processor 205.

Method 300 includes a functional result-oriented step for presenting a challenge (step 305). Step 305 may include any corresponding acts for accomplishing the result of presenting a challenge. However, in the illustrated example of FIG. 3, the step 305 includes a corresponding act of identifying a type of challenge (act 302). Act 302 can include identifying a type of challenge from among a plurality of different types of challenges. For example, challenge module 248 may have access to a plurality of different types of challenges, such as, for example, random number problems, cryptographic problems, and digital signatures problems. Challenge module 248 may identify a type of challenge from among the plurality of different types of challenges based on, for example, data included in a request (e.g., request 231), a previously established context (e.g., a prior agreement on a type of challenge) between message processors 205 and 208, or an intersection of supported challenges between message processors 205 and 208.

It should be understood that the present invention is not limited to messaging using any specific transport protocol and format. However, one example protocol that may be used to implement the principles of the present invention is called Simple Object Access Protocol ("SOAP"). Electronic messages depicted in FIG. 2 may be SOAP messages that use any of a number of lower level protocols, such as, for example, HyperText Transfer Protocol ("HTTP") or Direct Internet Message Encapsulation ("DIME") as a transport.

In some embodiments, supported challenges can be included in a data structure that is included within a SOAP envelope. The following represents an example Supported Challenges XML element that may be included in the header and/or body of a SOAP envelope for representing supported challenges:

1. <SupportedChallenges>
2. .
3. .
5. <Type>. . . </Type>
5. .
6. .
7. </SupportedChallenges>

The three periods between the <Type> and </Type> tags (an ellipsis) illustrates type data for a particular type of challenge. A string of text, a Uniform Resource Identifier ("URI"), or an XML Scehma QName can be included in type data to identify a particular type of challenge. Two periods on consecutive vertical lines (a vertical ellipsis), such as, for example, at lines 2 and 3, illustrates that additional types of challenges (e.g., represented by additional <Type> and </Type> tags) can be included between within the example Supported Challenges XML element. Message processors, such as, for example, message processors 205 and 208 can exchange Support Challenge XML elements similar to the example Supported Challenges XML element to determine an intersection of supported challenges. In some embodiments, the example Supported Challenges XML element is included in the header portion of a SOAP envelope, while distributed application data is included in the body portion of the SOAP envelope.

Based on desired functionality, an application designer may design distributed application 242 to request a particular type of challenge (e.g., a challenge represented by a particular XML schema). Challenge module 248 may identify the type of challenge requested by distributed application 242. Thus, an application designer of distributed application 242 may have increased control over the types of challenges that can be identified.

Step 305 also includes a corresponding act of issuing a challenge (act 303). Act 303 can include issuing a challenge in accordance with the identified type of challenge. For example, as illustrated by arrow 2 in FIG. 2, message processor 208 issues electronic message 240, which includes challenge 241, to message processor 205. Challenge 241 may be a challenge issued from distributed application 242B to distributed application 242A.

Figure 4:
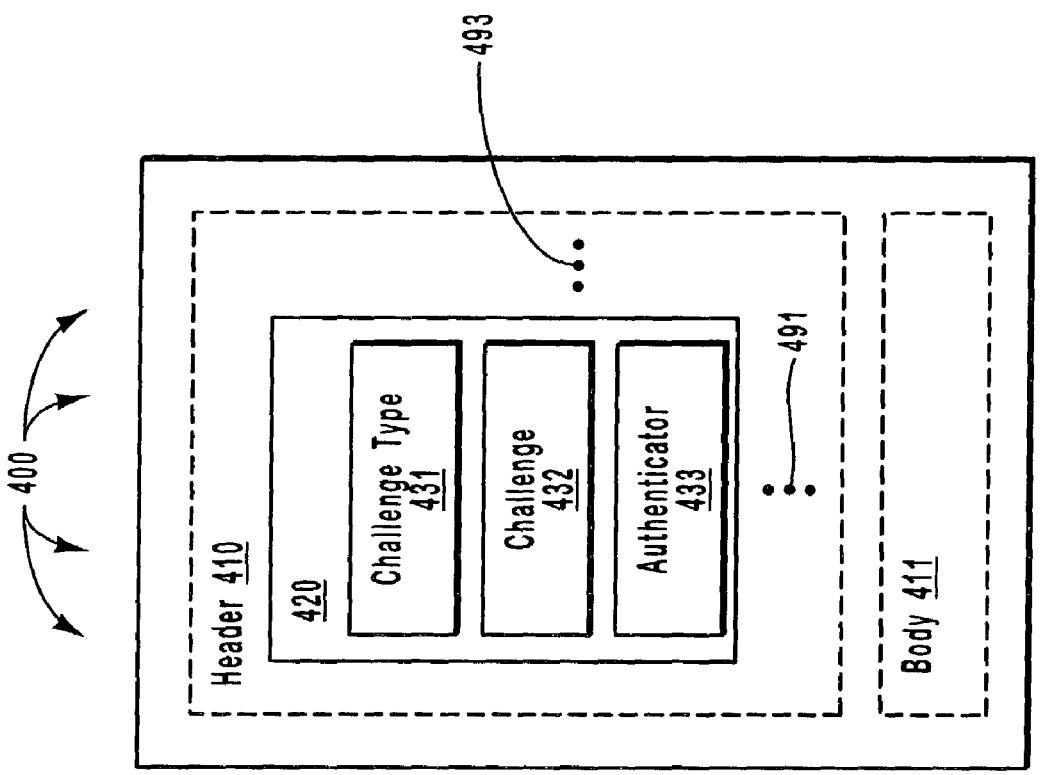
FIG. 4 illustrates an example of a message that can be used to issue a challenge.

Depicted in FIG. 4 is an electronic message 400. Electronic message 400 is an example of one format of electronic message that can be used when implementing the principles of the present invention. Electronic message 240 may be of a format similar to electronic message 400. Electronic message 400 includes header 410 and body 411. Generally, header data included in header 410 determines how body data in body 411 is to be processed. In the example electronic message 400, header 410 includes challenge marker 420, which further includes the fields challenge type 431, challenge 432, and authenticator 433 (an example of an authentication token). Ellipsis 493 and vertical ellipsis 491 illustrate that other fields can be included within challenge marker 420. Although a single challenge marker (challenge marker 420) is illustrated within header 410 it should be understood other challenge markers could also be included.

Although depicted within header 410, challenge marker 420 may also be included in the body of an electronic message, such as, for example, within body 411. In some embodiments, one or more of the fields of challenge marker 420 are included in header 410 and one or more of the fields of challenge marker 420 are included in body 411. In some embodiments, challenge marker 420 can be a data structure that is included within a SOAP envelope with header 410 being the header field of the SOAP envelope, and with body 411 being the body of the SOAP envelope. The following represents an example Challenge XML element that can be included in the header and/or body of a SOAP envelope to represent an issued challenged:

| | |
|---|---|
| 1. | <Challenge> |
| 2. | <Type>RandomNumber</Type> |
| 3. | <Parameters> |
| 4. | <Min>1000000</Min> |
| 5. | <Max>1100000</Max> |
| 6. | <Digest>FEOIJF . . . </ Digest> |
| 7. | </Parameters > |
| 8. | <Authenticator>FHRH . . . </Authenticator> |
| 9. | </Challenge> |

The sub-elements within the example Challenge XML element (i.e., between the <Challenge> and </Challenge> tags) can include one more free-form XML documents. Likewise, the sub-elements within the example Challenge XML element can include one more XML documents that are defined in accordance with an XML schema accessible to message processors 205 and 208. The example Challenge XML element includes a "Type" sub-element, a "Parameters" sub-element, and an "Authenticator" sub-element. However, inclusion of all of these sub-elements within a SOAP envelope (or any other electronic message) is optional. In some embodiments, the example Challenge XML element is included in the header portion of a SOAP envelope, while distributed application data is included in the body portion of the SOAP envelope.

These sub-elements are included merely to illustrate one example of some of the elements that can be used to implement the principles of the present invention. Depending on the desired functionality one, some, or all of these sub-elements, can be included in an electronic message. Further, it would be apparent to one skilled in the art, after having reviewed this description, that a wide variety of other sub-elements, in addition to the illustrated sub-elements, can be used to implement the principles of the present invention. For example, sub-elements representing any of the fields of electronic message 400 can be included in an XML element.

The Type sub-element (line 2) is an example of a sub-element that can be used to represent a type of challenge. In the example Challenge XML element, the type sub-element includes the text string "RandomNumber." This can indicate that the type of challenge represented by the example Challenge element is a random number problem.

The Parameters sub-element (lines 3-7) is an example of a sub-element that can be used to represent parameters for implementing a challenge. This can include parameters for implementing a challenge of the type represented by the Type sub-element. For, example the parameters within the Parameters sub-element of the example Challenge XML element can represent parameters for implementing a random number problem.

The Min sub-element (line 4) and the Max sub-element (line 5) represent a range of numbers from which a random number is to be identified. In the example Challenge XML element, a range of numbers between 1,000,000 (one-million) and 1,100,000 (one-million one-hundred thousand) is represented. The Digest sub-element represents a digest value of a particular number within the range of numbers. A challenge implemented with the parameters in the Parameters sub-element can be used to challenge a message processor to find a random number between 1,000,000 and 1,100,000. A message processor attempting to find an answer to the challenge may calculate digest values of numbers between 1,000,000 and 1,100,000 until a digest value of "FEOIJF" is calculated.

It should be understood that depicted range of numbers and digest value are merely examples. Virtually any range of numbers and digest value can be used. Calculating an answer to a random number problem can cause a message processor to expend a fixed amount of processing cycles. This may be desirable when an issuing message processor is attempting to reduce the impact of a denial of service attack. In some embodiments, a specified amount of processor cycles is configured as a fixed upper bound. In these embodiments, a request can be processed after the specified amount of processor cycles are expended.

When a message processor desires an increased amount of processor cycles be expended to calculate an answer, the message processor can increase the range of numbers, such as, for example, a range from 1,000,000 to 2,000,000 (two-million). On the other hand, when a message processor desires a decreased amount of processor cycles be expended to calculate an answer, the message processor can decrease the range of numbers, such as, for example, a range from 1 to 50,000. The parameters of other types of challenges (in addition to random number problems) can also be varied to increase or decrease the amount of processor cycles that are expended to calculate an answer. Virtually any hashing algorithm (e.g., SHA1) can be used to calculate a digest value.

Although a random number problem is represented by the example Challenge XML element, other types of challenges, such as, for example, cryptographic problems can also be represented. For example, a challenge could contain a first key (e.g., within a parameters sub-element) encrypted for a particular message processor using a second key known to the particular message processor. Instead of an answer to the cryptographic problem, electronic messages may be signed or encrypted using the first key. It may be that an encrypted key is passed as a security token.

The Authenticator sub-element (line 8) is an example of a sub-element that can be used to represent an authentication token that is to be returned with can answer to a challenge. An authentication token can contain an encrypted type of challenge, encrypted timestamp, and/or encrypted answer using a symmetric key for a service. An Authenticator sub-element can be returned along with an answer to a challenge to increase the efficiency with which an answer can be verified. An authentication token may be undecipherable to message processors other than the message processor that issued the authentication token. An authentication token can be viewed as including state information for an issued challenge. Thus, a message processor that issues a challenge can conserve system resources (e.g., system memory and/or disk space) that would otherwise be consumed to maintain the state information.

Method 300 includes an act of receiving a challenge (act 307). This can include receiving a challenge that was issued in accordance with a type of challenge that was identified from among a plurality of different types of challenges. For example, as illustrated by arrow 2 in FIG. 2, message processor 205 can receive electronic message 240, which includes request 241, from message processor 208.

Method 300 includes a functional result-oriented step for responding to the received challenge (step 310). Step 310 may include any corresponding acts for accomplishing the result of responding to the received challenge. However, in the illustrated example of FIG. 3, the step 305 includes a corresponding act of formulating a response to the challenge (act 308). Act 308 can include message processor 205 formulating a response to the challenge 241 in accordance with the type of challenge that was identified by message processor 208.

Similar to challenge module 248, response module 245 may have access to a plurality of different types of challenges. Response module 245 may identify a type of challenge based on challenge data included in an issued challenge. For example, response module 245 can use a Type sub-element included in challenge 241 to identify the type of challenge for formulating a response to challenge 241. Based on desired functionality, an application designer may design distributed application 242 to request a particular type of response (e.g., a response represented by a particular XML schema). Response module 245 may identify the type of challenge requested by distributed application 242. Thus, an application designer of distributed application 242 may have increased control over how a response is formulated.

Formulating a response to a challenge can include calculating an answer to the challenge. For example, receiving the challenge of the example Challenge XML element can cause message processor 205 to calculate digest values for each number in the range of numbers between 1,000,000 and 1,100,000 until the digest value FEOIJF is calculated. The same hash algorithm used to calculate the digest value FEOIJF at message processor 208 can be used when calculating digest values for each number in the ranges of numbers at message processor 205. Formulating a response can also include inserting a challenge type, a previously received authentication token, or a previously issued request (e.g., request 231) in an electronic message.

Step 310 also includes a corresponding act of issuing a second request that includes the formulated response (act 309). Act 309 can include issuing a second electronic request, which includes the formulated response, to access the service. For example, as illustrated by arrow 3 in FIG. 2, message processor 205 can issue electronic message 250, which includes response 251, from message processor 208. Response 251 may be a response from distributed application 242A to distributed application 242B.

Figure 5:
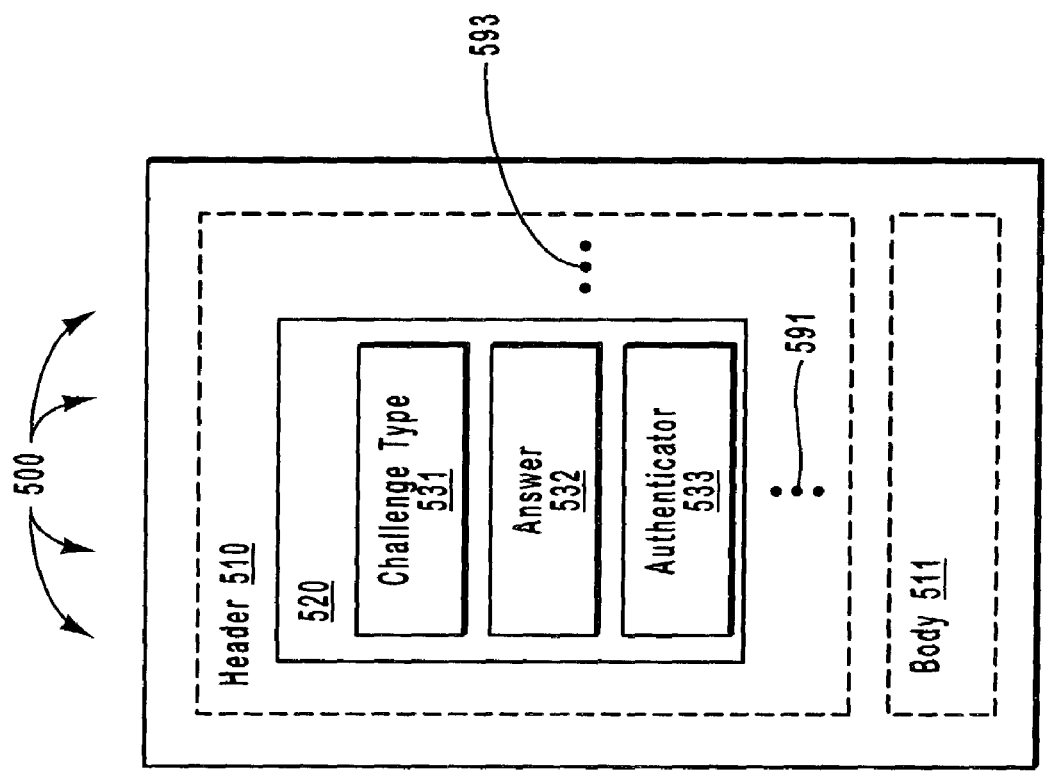
FIG. 5 illustrates an example of a message that can be used to respond to a challenge.

Depicted in FIG. 5 is an electronic message 500. Electronic message 500 is an example of one format of electronic message that can be used when implementing the principles of the present invention. Electronic message 250 may be of a format similar to electronic message 500. Electronic message 500 includes header 510 and body 511. Generally, header data included in header 510 determines how body data in body 511 is to be processed. In the example electronic message 500, header 510 includes response marker 520, which further includes the fields challenge type 531, answer 532, and authenticator 533 (an example of an authentication token).

Ellipsis 591 and vertical ellipsis 595 illustrate that other fields can be included within response marker 520. Although a single response marker (response marker 520) is illustrated within header 510 it should be understood other response markers could also be included.

Similar to message 400, any of the fields in message 500 can be included in header 510 or body 511. In some embodiments, response marker 520 can be a data structure that is included within a SOAP envelope with header 510 being the header field of the SOAP envelope, and with body 511 being the body of the SOAP envelope. The following represents an example Response XML element that can be included in the header and/or body of a SOAP envelope to represent a response:

```
1.   <Response>
2.     <Type>RandomNumber</Type>
3.     <Answer> 1010101 </Answer>
4.     <Authenticator>FHRH . . . </Authenticator>
5.   </Response >
```

The sub-elements within the example Response XML element (between the <Response> and </Response> tags) can include one more free-form XML documents. Likewise, the sub-elements within the example Response XML element can include one more XML documents that are defined in accordance with an XML schema accessible to message processors 205 and 208. The example Response XML element includes a "Type" sub-element, an "Answer" sub-element, and an "Authenticator" sub-element. However, inclusion of all of these sub-elements within a SOAP envelope (or any other electronic message) is optional. In some embodiments, the example Response XML element is included in the header portion of a SOAP envelope, while distributed application data is included in the body portion of the SOAP envelope. Sub-elements representing any of the fields of electronic message 500 can be included in an XML element.

The Type sub-element (line 2) is an example of a sub-element that can be used to represent a type of challenge that is being responded to. In the example Response XML element, the type sub-element includes the text string "RandomNumber." This can indicate that a message processor is responding to a random number problem.

The Answer sub-element (line 3) is an example of a sub-element that can be used to represent an answer to a challenge. In the example Response XML element, the Answer sub-element includes the text string 1010101. This can indicate that the value 1,010,101 (one-million ten-thousand one-hundred and one) was calculated as an answer to a RandomNumber challenge. For example, the value 1,010,101 may have a digest value of FEOIJF as represented in the example Challenge XML element.

The Authenticator sub-element (line 4) is an example of a sub-element that can be used to represent an authentication token that was received along with an issued challenge. An authentication token can be included along with the answer to increase the efficiency with which an answer can be verified. The authentication token can include state information for the issued challenge and/or the response. Thus, a message processor that responds to a challenge can conserve system resources (e.g., system memory and/or disk space) that would otherwise be consumed to maintain the state information. In some embodiments, a type of challenge can be embedded in an authenticator sub-element. This can reduce the need for including a separate Type sub-element in a response XML element (or in any other type of response element).

The method 300 also includes an act of receiving a second request that includes the response to the challenge (act 304). Act 304 can include receiving a second electronic request, which includes a response to the issued challenge, to access the service. For example, as illustrated by arrow 3 in FIG. 2, message processor 208 can receive electronic message 250, which includes response 251, from message processor 205.

When an appropriate response to an issued challenge is received, a message processor may process a request. For example, message processor 208 may process request 231 in response to receiving response 251. However, when an inappropriate response is received, message processor 208 may not process a request. Message processor 208 may send a notice to message processor 205 indicating that a request (e.g., request 231) was or was not processed.

When a response is received, message processor 208 may decrypt an included authentication token using an appropriate key (e.g., a symmetric key). Decrypting an authentication token can reveal a type of challenge, an answer, and a time stamp (and thus there is little, if any, need to maintain these at message processor 208). A revealed time stamp may be compared to the current time to determine a length of time since a challenge was issued. If the length of time is within a specified threshold (e.g., 5 minutes) a request may be processed. If the length of time is not within the specified threshold a request may not be processed.

The revealed type of challenge and answer can be compared to the type of challenge and answer included in the response (e.g., included in response 251). When the results of the comparisons are appropriate, an associated request (e.g., request 231) can be processed. For example, if a revealed answer (from an authentication token) matches an answer included in a response (e.g., the values are equal) it can be determined that the answer is correct. If a revealed type of challenge matches a type of challenge included in a response (e.g., text strings or URIs are equal) it can be determined that the response is a response to the correct type of challenge. When the results of the comparisons are not appropriate an associated request may not be processed. In some embodiments, the comparisons can also be used to authenticate a message processor.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In a distributed system including a server message processor that is communicatively coupled to one or more other message processors such that the server message processor and the one or more other message processors can communicate by transferring electronic messages, a method for the server message processor to challenge a client message processor, the method comprising:

an act of receiving a first electronic request from the client message processor to access a service at the server message processor;

an act of identifying a type of challenge from among a plurality of different types of challenges, each different type of challenge having corresponding different algorithmic processing utilized for computing a response to the type of challenge;

an act of issuing a challenge along with a token to the client message processor, the challenge and token issued in accordance with the identified type of challenge, the token containing state information related to the challenge such that the server message processor is relieved from having to use system resources to maintain state information related to the challenge while waiting for a response to the challenge;

an act of receiving a second electronic request to access the service from the client message processor, the second electronic request including a response to the challenge and the token, the response containing an answer to the challenge; and an act of comparing the contained answer to the state information contained in the token to determine if the answer represents an appropriate answer to the challenge without referring to other maintained state information related to the challenge.

2. The method as recited in claim 1, wherein the act of receiving a first electronic request from the client message processor comprises an act of receiving a first electronic message.

3. The method as recited in claim 1, wherein the act of receiving a first electronic request from the client message processor to access a service at the server message processor comprises an act of receiving a first electronic request to access a portion of distributed application at the server message processor.

4. The method as recited in claim 1, wherein the act of identifying a type of challenge from among a plurality of different types of challenges comprises an act of identifying a type of challenge from among a plurality of different types challenges based on a previously established context between an application at the server message processor and an application at the client message processor, the context representing an agreement to a specified type of challenge from among the plurality of different types of challenges.

5. The method as recited in claim 1, wherein the act of identifying a type of challenge from among a plurality of different types of challenges comprises an act of identifying a type of challenge selected from among a random number problem, a cryptographic problem, and a digital signature problem.

6. The method as recited in claim 1, wherein the act of issuing a challenge along with a token to the client message processor comprises an act of issuing a challenge along with a token that contains an encrypted version of the appropriate answer for the challenge such that the server message processor is relieved from having to use system resources to store the answer while waiting for a response to the challenge from the client message processor.

7. The method as recited in claim 1, wherein the act of issuing a challenge along with a token to the client message processor comprises an act of issuing a challenge along with a token that contains an indication of the identified type of challenge such that the server message processor is relieved from having to use system resources to store the type of the identified challenge while waiting for a response to the challenge from the client message processor.

8. The method as recited in claim 1, wherein the act of issuing a challenge along with a token to the client message processor comprises an act of issuing a challenge along with a token that contains a time stamp such that the server message processor is relieved from having to use system resources to store the time the challenge was issued to the client message processor while waiting for a response to the challenge from the client message processor.

9. The method as recited in claim 1, wherein the act of issuing a challenge along with a token to the client message processor comprises an act of issuing a challenge that will cause the client message processor to expend a fixed amount of processing cycles so as to potentially reduce the impact of a denial of service attack against the server message processor.

10. The method as recited in claim 1, wherein the act of receiving a second electronic request to access the service from the client message processor comprises an act of receiving a second electronic request from a portion of a distributed application at the client message processor.

11. The method as recited in claim 1, wherein the act of receiving a second electronic request to access the service from the client message processor comprises an act of receiving a schema-based response to the issued challenge.

12. The method as recited in claim 1, wherein the act of receiving a second electronic request to access the service for the client message processor comprises an act of receiving a SOAP envelope.

13. The method as recited in claim 1, wherein the act of an act of comparing the contained answer to a portion of the contents of the token to determine if the answer represents an appropriate answer to the challenge, comprises the following:
an act of decrypting the token to reveal the appropriate answer to the challenge; and
an act of comparing the revealed answer to the contained answer.

14. The method as recited in claim 13, further comprising:
an act of determining that the second electronic request should be processed based on the results of the comparison.

15. In a distributed system including a server message processor that is communicatively coupled to one or more other message processors such that the server message processor and the one or more other message processors can communicate by transferring electronic messages, a method for the server message processor to challenge a client message processor, the method comprising:
an act of receiving a first electronic request from the client message processor to access a service at the server message processor;
a step for presenting a challenge along with a token to the client message processor so as to determine if the client message processor is involved in a denial of service attack against the server message processor, the token containing state information related to the challenge such that the server message processor is relieved from having to use system resources to maintain state information related to the challenge while waiting for a response to the presented challenge; and
an act of receiving a second electronic request to access the service from the client message processor, the second request including a response to the challenge and the token, the response containing an answer to the challenge; and
an act of comparing the contained answer to the state information contained in the token to determine if the answer represents an appropriate answer to the challenge without referring to other maintained state information related to the challenge.

16. In a distributed system including a client message processor that is communicatively coupled to one or more other message processors such that the client message processor and the one or more other message processors can communicate by transferring electronic messages, a method for the client message processor to respond to a challenge from a server message processor, the method comprising:
an act of issuing a first electronic request to access a service at the server message processor;
an act of receiving a challenge and a token from the server message processor, the challenge and token being issued in accordance with a type of challenge that was identified from among plurality of different types of challenges available to the server message processor, the token containing state information related to the challenge such that the client message processor is relieved from having to use system resources to maintain state information related to the challenge;
an act of formulating a response to the challenge in accordance with the type of challenge that was identified by the server message processor; and
an act of issuing a second electronic request to access the service to the server message processor, the second electronic request including the formulated response along with the token such that the server message processor can use the state information contained in the token to determine if the formulated response is appropriate without referring to other maintained state related to the challenge.

17. The method as recited in claim 16, wherein the act of issuing a first electronic request to access a service at the server message processor comprises an act of sending a first electronic message.

18. The method as recited in claim 16, wherein the act of issuing a first electronic request to access a service at the server message processor comprises an act of a portion of a distributed application at the client message processor issuing a first electronic request.

19. The method as recited in claim 16, wherein the act of receiving a challenge and a token from the server message processor comprises an act of receiving a challenge and a token that contains an encrypted version of an appropriate answer to the challenge.

20. The method as recited in claim 16, wherein the act of receiving a challenge and a token form the server message processor comprises an act of receiving a challenge and a token that contains an indication of the type of the received challenge.

21. The method as recited in claim 16, wherein the act of receiving a challenge and a token from the server message processor comprises an act of receiving a specified type of challenge selected from among a random number problem, a cryptographic problem, and a digital signature problem.

22. The method as recited in claim 16, wherein the act of receiving a challenge and a token from the server message processor comprises an act of receiving a challenge based on a previously established context between an application at the server message processor and an application at the client message processor, the context representing an agreement to a specified type of challenge from among the plurality of different types of challenges.

23. The method as recited in claim 16, wherein the act of receiving a challenge and a token from the server message processor comprises an act of receiving a challenge that will cause the client message processor to expend a fixed amount of processing cycles.

24. The method as recited in claim 16, wherein the act of formulating a response to the challenge in accordance with the type of challenge that was identified comprises an act of formulating a response in accordance with a schema.

25. The method as recited in claim 16, wherein the act of formulating a response to the challenge in accordance with the type of challenge that was identified comprises an act of expending a fixed amount of processor cycles.

26. The method as recited in claim 16, wherein the act of formulating a response to the challenge in accordance with the type of challenge that was identified comprises an act of formulating an answer to the challenge that, if received at the server message processor, would indicate to the server message processor that the second electronic request is to be processed.

27. The method as recited in claim 16, wherein the act of issuing a second electronic request, which includes the formulated response, comprises an act of a portion of a distributed application causing the second electronic request to be issued.

28. The method as recited in claim 16, wherein the act of issuing a second electronic request, which includes the formulated response, comprises an act of issuing a second request that includes a schema-based response.

29. The method as recited in claim 16, wherein the act of issuing a second electronic request comprises an act of sending a SOAP envelope.

30. The method as recited in claim 16, wherein the act of issuing a second electronic request, which includes the formulated response, comprises an act of sending a response that indicates to the server message processor that the server message processor should process the second electronic request.

31. The method as recited in claim 16, further comprising:
an act of receiving an indication that the second electronic request was processed.

32. The method as recited in claim 22, wherein the act of receiving a challenge and a token comprises an act of receiving a SOAP envelope.

33. The method as recited in claim 24, wherein the act of formulating a response in accordance with a schema comprises an act of formulating a response in accordance with an XML schema.

34. In a distributed system including a client message processor that is communicatively coupled to one or more other message processors such that the client message processor and the one or more other message processors can communicate by transferring electronic messages, a method for the client message processor to respond to a challenge from a server message processor, the method comprising:
an act of issuing a first electronic request to access a service at the server message processor;
an act of receiving a challenge and a token from the server message processor, the challenge and the token being issued in accordance with a type of challenge that was identified from among plurality of different types of challenges at the server message processor, the token containing state information related to the challenge such that the client message processor is relieved from having to use system resources to maintain state information related to the challenge; and
a step for responding to the received challenge so as to indicate to the server message processor that the client message processor is not involved in a denial of service attack against the server message processor, the response including an answer to the received challenge and the token such that the server message processor can use the state information contained in the token to determine if the answer is appropriate without referring to other maintained state related to the challenge.

35. A computer program product for use in a distributed system including a server message processor that is communicatively coupled to one or more other message processors such that the server message processor and the one or more other message processors can communicate by transferring electronic messages, the computer program product for implementing a method for the server message processor to challenge a client message processor, the computer program product comprising one or more computer-readable media having stored thereon the following:
computer-executable instructions for receiving a first electronic request from the client message processor to access a service at the server message processor;
computer-executable instructions for selecting a type of challenge from among a plurality of different types of challenges, each different type of challenge having corresponding different algorithmic processing utilized for computing a response to the type of challenge;
computer-executable instructions for issuing a challenge along with a token to the client message processor, the challenge and token issued in accordance with the identified type of challenge, the token containing state information related to the challenge such that the server message processor is relieved from having to use system resources to maintain state information related to the challenge while waiting for a response to the challenge;
computer-executable instructions for receiving a second electronic request to access the service from the client message processor, the second request including a response to the issued challenge and the token, the response containing an answer to the challenge; and
computer-executable instructions for comparing the contained answer to the state information contained in the token to determine if the answer represents an appropriate answer to the challenge without referring to other maintained state information related to the challenge.

36. A computer program product for use in a distributed system including a client message processor that is communicatively coupled to one or more other message processors such that the client message processor and the one or more other message processors can communicate by transferring electronic messages, the computer program product for implementing a method for the client message processor to respond to a challenge from a server message processor, the computer program product comprising one or more computer-readable media having stored thereon the following:
computer-executable instructions for issuing a first electronic request to access a service at the server message processor;
computer-executable instructions for receiving a challenge and a token from the server message processor, the challenge being issued in accordance with a type of challenge that was selected from among plurality of different types of challenges available to the server message processor, the token containing state information related to the challenge such that the client message processor is relieved from having to use system resources to maintain state information related to the challenge;
computer-executable instructions for formulating a response to the challenge in accordance with the type of challenge that was identified by the server message processor; and
computer-executable instructions for issuing a second electronic request to access the service to the server message processor, the second electronic request including the formulated response along with the token such that the server message processor can use the state information contained in the token to determine if the formulated response is appropriate without referring to other maintained state related to the challenge.

* * * * *